United States Patent [19]

Borman

[11] 4,002,228
[45] Jan. 11, 1977

[54] HYDRODYNAMIC DRIVE AND SLIPPING CLUTCH

[75] Inventor: August H. Borman, Farmington, Mich.

[73] Assignee: General Motors Corporation, Detroit, Mich.

[22] Filed: June 23, 1975

[21] Appl. No.: 589,595

[52] U.S. Cl. .................................. 192/3.3; 192/54
[51] Int. Cl.² .................................. F16D 39/00
[58] Field of Search ............... 192/3.29, 3.3, 3.31, 192/3.33, 54, 56 F; 74/733

[56] References Cited

UNITED STATES PATENTS

| | | | |
|---|---|---|---|
| 3,537,553 | 11/1970 | Olsen | 192/3.33 |
| 3,566,998 | 3/1971 | Honda | 192/3.3 |
| 3,730,315 | 5/1973 | Annis et al. | 192/3.3 |
| 3,734,251 | 5/1973 | Annis et al. | 192/3.3 |

*Primary Examiner*—Benjamin W. Wyche
*Attorney, Agent, or Firm*—Donald F. Scherer

[57] ABSTRACT

A hydrodynamic drive and slipping clutch arranged in parallel drive relation to provide a controlled slip input drive to a mechanical gear arrangement. The clutch slip is controlled by a passage having a variable opening responsive to the torque transmitted by the hydrodynamic drive to split the input torque so as to limit the torque transmission through the hydrodynamic drive. The clutch transmits the remainder of input torque from the prime mover to the gearing.

1 Claim, 4 Drawing Figures

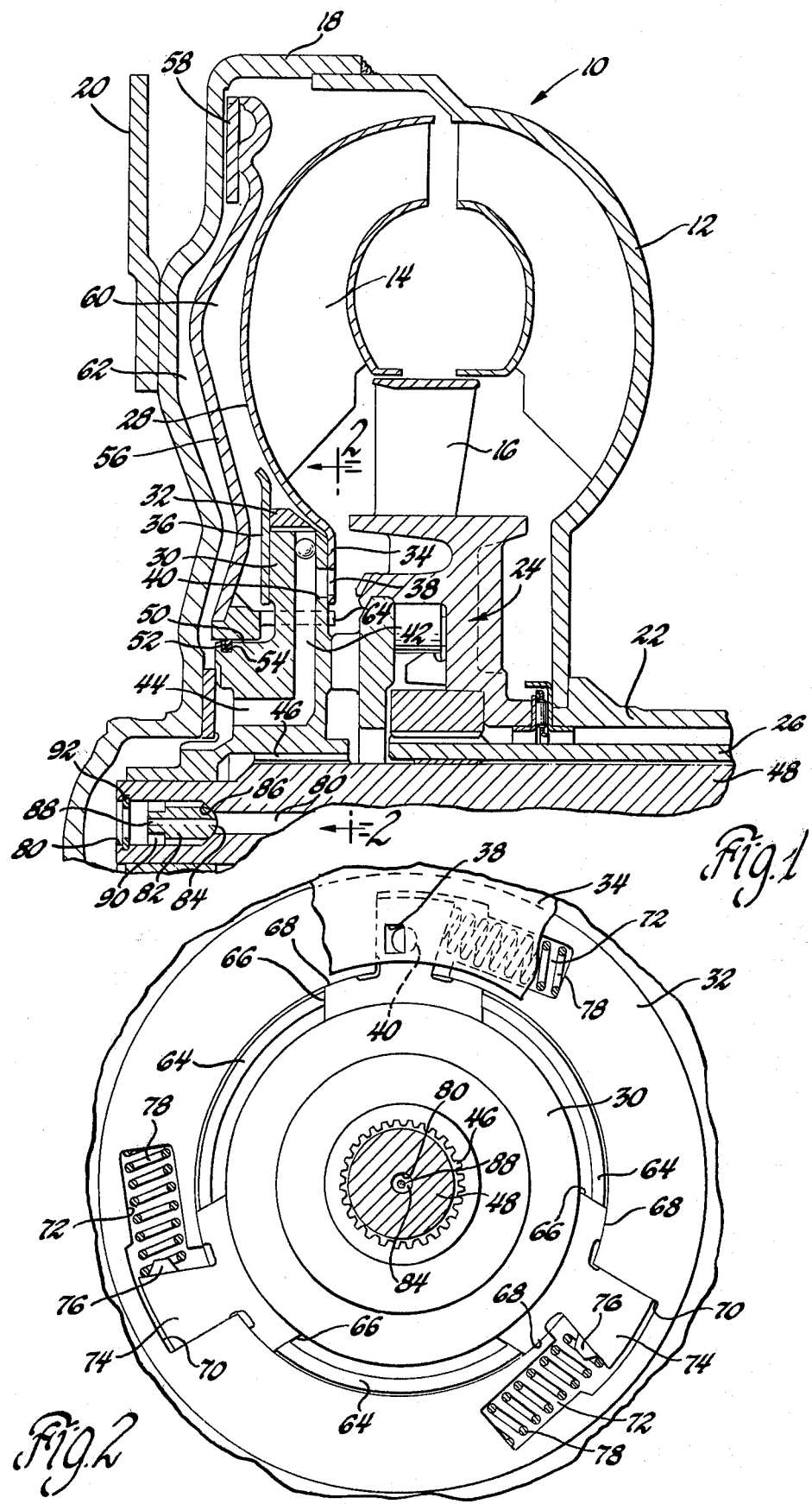

HYDRODYNAMIC DRIVE AND SLIPPING CLUTCH

This invention relates to hydrodynamic and friction clutch drives and more particularly to torque converter and friction clutch arrangements wherein parallel drive paths are provided in such a manner that the clutch is slippingly engaged to control the slip speed of the torque converter.

Prior art slipping clutches in parallel drive relation with a hydrodynamic device have included various structures and control philosophy. Annis et al, U.S. Pat. No. 3,730,315, utilizes turbine thrust to determine clutch engagement force to limit converter slip speed. Malloy, U.S. Pat. No. 3,693,478, utilizes converter speed and/or charge pressure to determine clutch engagement force to limit converter slip speed. The present invention utilizes turbine torque to signal clutch engagement.

The turbine member of the present invention is structurally arranged to permit relative rotation between the bladed member of the turbine and the turbine output hub. This relative rotation is controlled, within a torque range, by coil spring members such that at a predetermined torque value transmitted by the bladed element, a variable opening passage is sized to properly control fluid flow through the turbine hub. The fluid flow results in a controlled pressure differential on opposite sides of a single plate clutch, so that engagement force of the clutch is proportional to the differential pressure. Since the variable passage will provide more or less flow, depending on opening size, the turbine torque can be maintained substantially constant while clutch torque will vary such that turbine torque plus clutch torque will be substantially equal to input torque.

Since the torque converter must have some amount of slip speed to transmit torque, the slip speed of the present invention will be substantially constant through a wide range of input speeds. However, the slip speed characteristic will be slightly greater at low input speeds, due to torque converter characteristics, which from an engine torsional dampening requirement is a desirable characteristic. The use of turbine torque transmission as a control for clutch and therefore converter slip speed is more predictable than turbine thrust and requires less production control to maintain the slip speed within the desired range, and by controlling slip speed at a value less than conventional torque converters, the efficiency thereof is increased.

It is therefore a general object of this invention to provide an improved torque converter and clutch drive arrangement in which clutch slip speed is controlled in response to the torque transmitted by the turbine of the torque converter.

Another object of this invention is to provide an improved torque converter and clutch drive arrangement wherein the clutch engagement force is controlled by fluid flow through a variable opening passage formed in the torque converter and having the opening size determined by torque transmission through the torque converter.

These and other objects and advantages will be more apparent from the following description and drawings in which:

FIG. 1 is a cross-sectional view of a torque converter and clutch incorporating the present invention;

FIG. 2 is a view taken along line 2—2 of FIG. 1;

Figure 3:
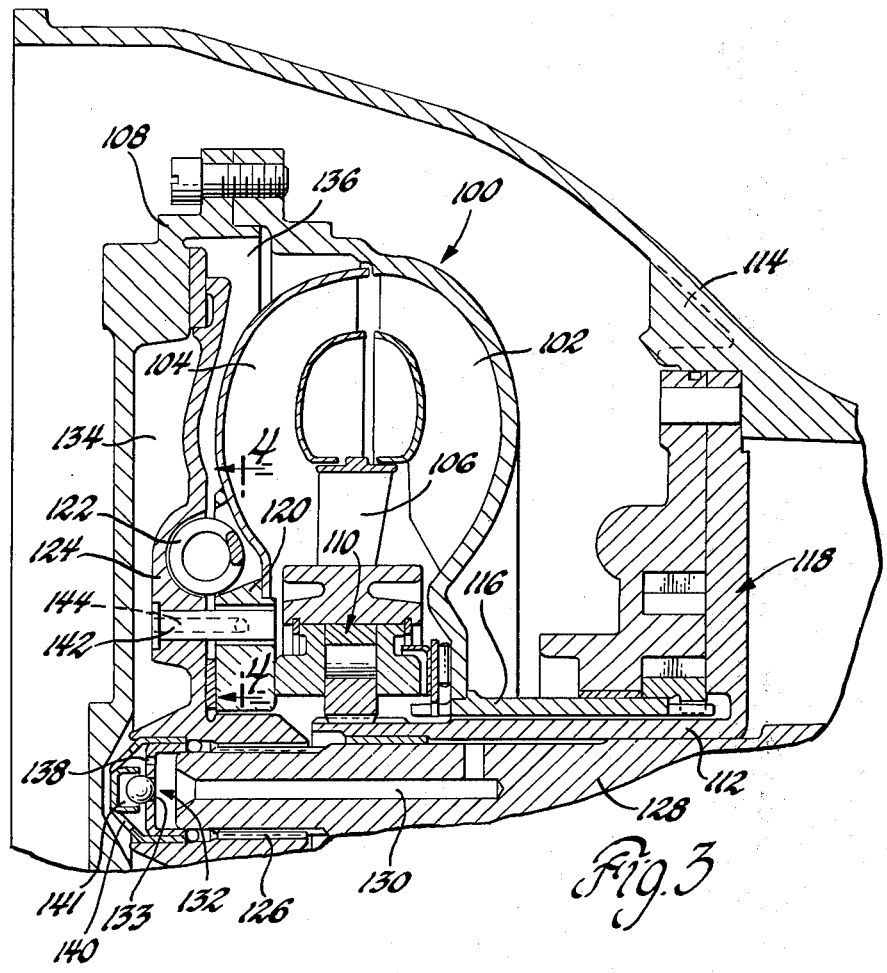
FIG. 3 is a cross-sectional view of another embodiment of the invention.
Figure 4:
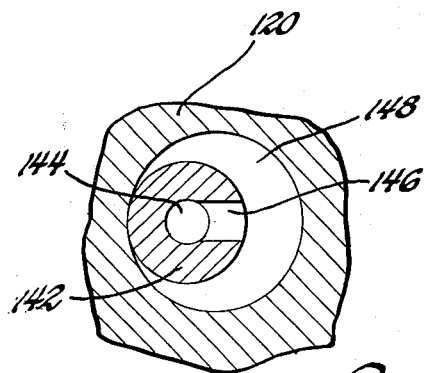
FIG. 4 is a view taken along line 4—4 of FIG. 3.

Referring to the drawings, there is shown in FIG. 1 a torque converter 10 having an impeller 12, a turbine 14 and a stator 16. The impeller 12 is welded or otherwise secured to an input shell 18 to which is secured a drive lug 20 adapted to be connected to and driven by a prime mover such as an internal combustion engine, not shown. The impeller 12 is also secured to a sleeve shaft 22 which is adapted to drive the conventional internal/external type gear pump, not shown, such that control fluid can be supplied in a well-known manner. The stator 16 is connected through a conventional one-way device 24 to a stator shaft 26 which shaft 26 is connected to the stationary housing of the transmission, not shown.

The turbine 14 includes a bladed portion 28 and a turbine hub 30. The bladed portion 28 of the turbine 14 is constructed in accordance with conventional techniques, as far as blading angle and installation is concerned. The bladed portion includes a spacer member 32 which is secured thereto and also includes two annular radially inward projecting portions 34 and 36 which are positioned closely adjacent the outer side portions of the turbine hub 30 and are secured to the spacer member 32. An opening or aperture 38 is formed in the annular portion 34 and is alignable with an opening or aperture 40 formed in the turbine hub 30. The opening 40 is in fluid communication with a passage 42 formed radially in the hub 30 which passage 42 is in communication with an axially extending passage 44 also formed in the hub 30. The inner diameter of hub 30 has formed thereon a spline 46 which is drivingly connected to a turbine output shaft 48. The turbine shaft 48 is adapted to be connected to a planetary gearing arrangement of any conventional design such as that shown in Winchell, et al, U.S. Pat. No. 3,321,056. The turbine hub 30 also has formed thereon a smooth cylindrical portion 50 in which is disposed a seal ring 52 which is positioned in a groove 54 formed in a cylindrical portion 50. A single plate clutch member 56 is slidably disposed on the cylindrical portion 50 and seal 52 and has an outer friction surface 58 adapted to frictionally engage the input shell 18. The clutch plate 56 and the cylindrical portion 50 and seal 52 cooperate with the turbine 14 and input shell 18 to form an engagement chamber 60 and a disengagement chamber 62 formed on opposite sides of the clutch plate 56. The clutch plate 56 also has a plurality of tangs 64 which provide a driving connection between clutch plate 56 and the turbine hub 30 by engaging shoulder 66 formed on the turbine hub 30 in a space disposed between the turbine hub 30 and the spacer 32.

As can be seen in FIG. 2, the spacer 32 is supported on a plurality of substantially constant radius surfaces 68 formed on the hub 30. A plurality of radial slot openings 70 and substantially chordal spring pockets 72 are also formed in the spacer 32. The hub 30 has formed thereon a plurality of radially extending drive lugs 74 which are disposed in the radial slots 70 and said lugs 74 have formed thereon a spring seat 76. A plurality of compression springs 78 are disposed between the drive lugs 74 and the spacer 32 such that springs permit relative rotation between the hub 30 and spacer 32 to control the opening and closing of apertures 38 and 40 in such a manner as to control fluid flow therethrough in response to torque transmitted from the bladed portion 28 of the turbine 14 to the hub 30 and then to the turbine output shaft 48.

The engagement chamber 60 is in fluid communication with and subject to the pressure of the fluid in the torque converter 10 and the disengagement chamber 62 is in fluid communication with an axially extending passage 80 formed in the turbine output shaft 48. A one-way check valve and restriction 82 is slidingly disposed in the passage 80 and has a rounded end 84 adapted to seat against a shoulder 86 formed in the passage 80, a central restriction passage 88 and a plurality of fluted lands 90. A stop ring 92 is disposed in the passage 80 to limit movement of the check valve 82 in one direction. When the check valve 82 is in the position shown, fluid pressure from the disengagement chamber 62 must pass through the fixed central restriction 88 and thereby fluid flow from the disengagement chamber 62 is controlled. When fluid pressure is admitted through passage 80, the check valve 82 will move against the stop 92 such that free flow through the fluted lands 90 to the disengagement chamber 62 is permitted. The control of fluid flow to and from the converter can be accomplished in a manner similar to that disclosed in the abovementioned Annis et al patent. The aperture 38 formed in the annular portion 34 of turbine 14 is in fluid communication with the fluid pressure in the torque converter. The passage 44 is in fluid communication with the disengagement chamber 62. When the apertures 38 and 40 are substantially open as shown in FIG. 2, free fluid flow between the torque converter 10 and the disengagement chamber 62 is permitted. However, when the apertures 38 and 40 are rotated relative to each other to close the opening formed thereby, the fluid flow to the disengagement chamber 62 is reduced accordingly. Since a fixed restriction outlet is provided from the fluid chamber, a reduction in pressure in the disengagement chamber will occur to permit the clutch 56 to be engaged to the input shell 18. The apertures 38 and 40 will move relative to each other when sufficient torque is transmitted from the bladed member 28 of the turbine 14 to the turbine hub 30 in an amount sufficient to compress the springs 78. As can be seen in FIG. 2, the apertures 38 and 40 if rotated sufficiently relative to each other, can substantially prevent fluid communication from the torque converter to the disengagement chamber 62. The compression springs 78 are designed such that at a predetermined torque transmission through the bladed element 28 the apertures 38 and 40 will be aligned sufficiently to provide fluid flow which will maintain the clutch 56 in a slipping engagement relation with the input shell 18, which slipping engagement will be sufficient to transmit the remainder of the input torque from the input shell 18 to the turbine hub 30. In most instances, it is considered sufficient to transmit twenty foot-pounds of torque through the turbine 14 with the remainder of the torque being transmitted by the clutch 56. If the turbine 14 should transmit more than the predetermined torque, the apertures 38 and 40 will move more toward the closing position such that the engagement force of clutch 56 will be increased to transmit more torque to the clutch 56 and less torque through the turbine 14. If the torque load on turbine 14 should decrease, the apertures 38 and 40 will be moved relatively in the opposite direction to permit more fluid flow which will result in higher pressure in the disengagement chamber 62 to reduce the torque capacity of the clutch 56. Thus, it can be seen that the clutch engagement force is conditioned upon the transmission of torque by the turbine 14. It is considered that the twenty foot-pounds of torque mentioned above provides sufficient slip in the torque converter such that engine vibration dampening is occasioned through the torque converter at the slip speed which is coincident to the twenty foot-pounds of torque transmission.

The torque converter and clutch shown in FIG. 3 is very similar to the torque converter and clutch shown in FIG. 1 with the major difference being the structure of fluid passage which communicates with the disengagement chamber of the clutch. As seen in FIG. 3, there is a torque converter 100 having an impeller 102, a turbine 104 and a stator 106 each of which are bladed elements in which the blading is of standard construction. The impeller 102 is secured to an input shell 108 which is adapted to be drivingly connected to an engine, not shown. The stator 106 is drivingly connected to a one-way device 110 which is secured to a stator shaft 112 which in turn is secured to the transmission housing 114. The impeller 102 is secured to a sleeve shaft 116 which is drivingly connected to a conventional internal/external gear pump, generally designated as 118. The turbine 104 is secured to a hub 120 which is drivingly connected through a plurality of springs 122 to a clutch and output hub structure 124. The output hub structure 124 is splined at 126 to a turbine shaft 128 which turbine shaft 128 has a central axial passage 130. The passage 130 is in fluid communication through a one-way check valve 132 with a disengagement chamber 134 formed between clutch 124 and the input shell 108. The clutch 124 also has an engagement chamber 136 which is subject to the fluid pressure surrounding the torque converter 100.

The one-way check valve 132 is constructed such that when the ball check is seated at 133 fluid flow must pass through a fixed restriction 138 and when the check valve is moved to open, fluid flow is free to pass through a plurality of openings 140 formed in a retainer housing 141. Thus the check valve permits free flow in one direction and restricted flow in the opposite direction.

The hub and clutch 124 has secured therein a pin member 142 which has formed therein an axial passage 144 in fluid communication with a radial passage 146. The pin 142 extends into an opening 148 formed in the hub 120 such that when the two hubs are spring-loaded together, the passage 146 is fully open to permit free flow from the torque converter circuit to the disengagement chamber 134 to prevent engagement of the clutch 124. However, as the torque transmission of turbine 104 increases to a predetermined value the springs 122 will be compressed to permit relative movement between the pin 142 and the hub 120 such that the opening 146 will be closed down to limit the fluid flow to the disengagement chamber 134 which reduction will result in a reduction in fluid pressure in the disengagement chamber. Thus an increasing engagement force on the clutch will result such that torque transmission will be taken through the clutch in a manner such that only a predetermined value of input torque is transmitted through the turbine 104 with the remainder of the torque being transmitted through clutch 124.

In the torque converter and clutch assemblies shown in FIGS. 1 and 3, fluid pressure is admitted to the torque converter between the stator and impeller in a conventional manner when it is desirable to engage the clutch. However, if it is desirable to maintain the clutch disengaged, the fluid flow for the converter operation is admitted through the check valve to the disengagement chamber of the clutch and then to the converter thereby maintaining the clutch in a disengaged position. In both of the torque converters shown in FIGS. 1 and 3, it should be understood that when the clutch is engaged, efficiency of the torque converter is substantially increased due to the reduction in slip speed below the normal slip characteristic of the torque converter. It should also be appreciated that since coil type compression springs can be constructed with considerable accuracy, the torque limitation on the turbine of the torque converter can be established within a very predictable and narrow range of operation.

Obviously many modifications and variations of this present invention are possible in light of the above teachings. It is therefore to be understood that within the scope of the appended claims the invention may be practiced otherwise than as specifically described.

I claim:
1. A drive mechanism comprising:
a torque converter including an input shell adapter to be driven by a prime mover, an impeller secured to said input shell and cooperating therewith to form an enclosed fluid space, a turbine disposed in the fluid space between said input shell and said impeller and cooperating with said impeller to form a toroidal fluid circuit, and an output hub connected to said turbine;
a fluid operated friction clutch disposed between said turbine and said input shell, an engagement chamber formed between said clutch and said turbine, a disengagement chamber formed between said clutch and said input shell, and a plurality of compression spring means for providing a drive torque transmitting connection between said turbine and said output hub;
variable opening passage means formed on said turbine and output hub for controlling fluid flow to said disengagement chamber in response to the torque transmitted through said spring means to effect an increasing engagement force on said clutch when the torque transmission through said spring means is above a predetermined value to limit the torque transmitted by said turbine and to limit the slip speed between said impeller and turbine, and
output means drivingly connected to said clutch for delivering torque from said drive mechanism.

* * * * *